(12) United States Patent
Oi

(10) Patent No.: US 6,738,696 B2
(45) Date of Patent: May 18, 2004

(54) CONTROLLER FOR VEHICLE WITH INFORMATION PROVIDING FUNCTION AND RECORDING MEDIUM

(75) Inventor: Masaya Oi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/002,133

(22) Filed: Dec. 5, 2001

(65) Prior Publication Data

US 2002/0072835 A1 Jun. 13, 2002

(30) Foreign Application Priority Data

Dec. 13, 2000 (JP) .................................. 2000-378894

(51) Int. Cl.[7] .......................... G06F 3/00; G06F 19/00
(52) U.S. Cl. ........................... 701/29; 701/31; 709/201
(58) Field of Search ........................... 701/29, 31, 34; 702/183, 185; 709/201, 223, 224, 315, 316, 317; 714/26, 38, 46; 700/17, 18, 79, 86, 87; 706/45, 46, 53, 54

(56) References Cited

U.S. PATENT DOCUMENTS

| | | | | |
|---|---|---|---|---|
| 5,003,476 A | * | 3/1991 | Abe ........................ | 364/424.03 |
| 5,005,129 A | | 4/1991 | Abe et al. ............... | 364/424.03 |
| 5,034,894 A | * | 7/1991 | Abe ........................ | 364/431.01 |
| 5,111,686 A | * | 5/1992 | Kamiya et al. ........ | 73/117.3 |
| 5,276,619 A | | 1/1994 | Ohara et al. ........... | 364/424.04 |
| 5,331,560 A | * | 7/1994 | Tamura .................. | 364/431.12 |
| 5,450,321 A | | 9/1995 | Crane ..................... | 364/424.04 |
| 5,541,840 A | * | 7/1996 | Gurne et al. ........... | 364/424.03 |
| 5,631,831 A | | 5/1997 | Bird et al. .............. | 364/424.034 |
| 5,671,141 A | | 9/1997 | Smith et al. ............ | 364/424.034 |
| 5,918,051 A | * | 6/1999 | Savitzky et al. ....... | 395/683 |
| 6,385,665 B1 | * | 5/2002 | Canady et al. ......... | 710/2 |
| 6,512,968 B1 | * | 1/2003 | de Bellefeuille et al. | 701/33 |

FOREIGN PATENT DOCUMENTS

| | | |
|---|---|---|
| EP | 0833140 A2 | 4/1998 |
| EP | 0987423 A2 | 3/2000 |
| JP | A-62-291537 | 12/1987 |
| JP | A-8-95788 | 12/1996 |

OTHER PUBLICATIONS

U.S. patent application Ser. No. 09/840,877, Maki et al., filed Apr. 2001.

* cited by examiner

*Primary Examiner*—Tan Q. Nguyen
*Assistant Examiner*—Dalena Tran

(57) ABSTRACT

The re-use property of a vehicular controller service program is improved by providing a structure capable of easily changing the method of communication to/from an external apparatus and a structure capable of easily changing the vehicle information required for such communication. A service management object communicates with an external scanning tool which is constituted separately from a service execution object including objects for obtaining the fault information. Each individual object thus implements only either communication function with the scanning tool or a vehicle information acquisition function. Thus when changes are required for one of these functions, the remaining object-oriented program modules can be re-used without change. The service execution object may be prepared to obtain every category of fault information desired depending on legislation or vehicle manufacturer requirements.

40 Claims, 8 Drawing Sheets

CONTROLLER FOR VEHICLE WITH
INFORMATION PROVIDING FUNCTION
AND RECORDING MEDIUM

CROSS REFERENCE TO RELATED APPLICATION

This application is based on and incorporates herein by reference Japanese Patent Application No. 2000-378894 filed on Dec. 13, 2000.

BACKGROUND OF THE INVENTION

1. Field of the Invention

The present invention relates to a vehicle controller with an information providing function, and more particularly, to a technique for realizing the information providing function with object-oriented programming.

2. Description of the Related Art

In recent years, progress in mechatronics, that is, combining mechanical techniques and electronic techniques, has progressed with advancements in electronic techniques such as the advent of high performance microprocessors. As a part of the progress of mechatronics, many computer systems have been introduced into vehicles such as automobiles and the like. Such on-board computer systems were developed to enhance resource saving, energy saving, driving performance, safety and other amenities that currently reside within vehicles. On-board computer systems include engine systems, driving systems, running/safety systems, entertainment systems and other systems.

In particular, a computer system (hereinafter, referred to as a vehicle controller) for controlling the vehicle, which is required to assure higher reliability, actually has improved reliability by providing self-diagnostic functions. That is, operating conditions of computer systems and sensors are automatically checked to ensure proper operation, and if a fault is generated, a fault code (DTC), as fault information, is generated and stored so that maintenance personnel can understand the contents of the fault. Vehicle information such as fault information can be read by a scanning tool connected to the vehicle and can be provided to an outside worker to facilitate adequate maintenance. The vehicle controller is provided with an information providing function to provide the requested vehicle information through communication with the scanning tool.

Here, an outline of operation for obtaining the vehicle information using the scanning tool will be explained. The vehicle information explained above also includes, in addition to the fault information, information about emissions and information about an actuator. Accordingly, the vehicle information is sorted into predetermined categories. Such categories are set as Mode $01 to Mode $09 depending on legislation. For example, the fault information usually includes freeze information covering vehicle conditions when a fault occurs and this freeze information is sorted as "Mode $02". Moreover, when the freeze information is considered, as an example, the freeze information is changed depending on the specifications of a vehicle manufacturer and therefore such categories have been set with every vehicle manufacturer in particular years.

Therefore, the scanning tool explained above designates the category and information included in the category and reads target information from such information. Namely, a service program to realize the information providing function obtains the vehicle information by determining the category designated by the scanning tool through communication with the scanning tool.

The invention solves several problems which are discussed below. Under the supposition that computer systems are mounted in a variety of positions in a vehicle, the vehicle information to be obtained by the scanning tool expands because of model changes. Therefore, addition to and/or alterations of the vehicle information is generated in timing of model changes. Moreover, due to differences between vehicle manufacturers and between types of vehicles, or due to differences between vehicle models or grades, the vehicle information is different. Additionally, the change of vehicle information is linked to the change of the category. Accordingly, the service program is requested to easily cover the change of the vehicle information including the change in units of category and moreover to have a format that enables the re-use of an unchanged part thereof.

Moreover, a communication method for the scanning tool changes in some cases, but it is preferred that the change of the communication method be covered with the service program so its unchanged part may be re-used. Accordingly, in the present invention, the re-use property defines a first object of forming the service program which is mounted into the vehicle controller which can easily cover the change of the communication method of the external apparatus, such as a scanning tool. A second object is forming the service program to easily cover the change of the requested vehicle information.

SUMMARY OF THE INVENTION

A service program realizing an information providing function of a vehicle controller is described to achieve the first object explained above. The service program is designed to be objected-aided and is formed in units of objects enabling re-use. The information providing function reads and outputs the vehicle information when a request is issued from the external apparatus such as the scanning tool. The present invention is particularly characterized in that the service program is provided with a service execution object and a service management object. The service execution object obtains the vehicle information based on a drive instruction.

Meanwhile, the service management object issues an instruction to the service execution object upon requesting information from the external apparatus through data communication therewith. This service management object also outputs the vehicle information obtained by the service execution object to the external apparatus. Namely, a vehicle information acquisition function and a function for communication with an external apparatus are respectively realized by individual objects. Thereby, when a method for communication with the external apparatus changes, it can be covered easily with a change of the service management object. In this case, the service execution object can be re-used as it is and thereby the re-use property of the service program improves.

In this specification, an expression mainly using the term "object" appears as required. It is a matter of course that the function is realized when the controller CPU in a vehicle executes a program in the object. Moreover, a service program to realize an information providing function of a controller for a vehicle to achieve the second object explained above is also formed in units of object enabling re-use and is also provided with a service execution object and a service management object. In this case, this service management object is prepared for every vehicle information group as a predetermined aggregation of the vehicle information and obtains vehicle information among the corresponding vehicle information groups based on the drive instruction.

Meanwhile, the service management object determines, upon an information request from the external apparatus, the service execution object through data communication with the external apparatus, issues the drive instruction to the service execution object and outputs vehicle information obtained by the service execution object to the external apparatus. In this case, since the service management object is prepared for every vehicle information group, the drive instruction is issued to the service execution object.

Continuing, since the service execution object is provided for every vehicle information group, if the requested vehicle information changes, an update job in units of the vehicle information group including the vehicle information can be realized. Therefore, change of the vehicle information can be covered easily. Moreover, the service execution object corresponding to the vehicle information group which is not changed can be re-used as it is and thereby the re-use property of the service program can be improved.

It is preferable that the vehicle information formed as an aggregation of the vehicle information having a higher possibility for simultaneous change, in consideration of a change pattern of the vehicle information. As an example, it is considered to form vehicle information as an aggregation of vehicle information based on legislation or requirements from vehicle manufacturers, or both. Namely, in this case, the vehicle information group is an aggregation for every category. As explained above, when the vehicle information having a higher possibility for the simultaneous change is defined as a vehicle information group, the change will be covered in the higher possibility only with the update job of the corresponding service execution object. As a result, the number of service execution objects to be re-used increases, making additional contribution to further improvement of re-use property of the service program.

It has already been described above that the external apparatus generally requests information by designating a category. Therefore, in the configuration where a plurality of service execution objects are prepared corresponding to the category as explained above, the service execution object determines, under the pre-condition that at least identification data to identify the vehicle information is included in the information request from the external apparatus, the corresponding service execution object based on this identification data. In this case, a determination process of the service execution object by the service management object can be simplified.

Moreover, the external apparatus usually designates information as a read object together with the category. Therefore, the service management object outputs, under a pre-condition that the designation data for designating the vehicle information in the vehicle information group is further included in the information request from the external apparatus, this designation data together with the drive instruction and thereby the service execution object obtains the vehicle information among the vehicle information group based on the designation data output from the service management object. In this case, the vehicle information acquisition process with the service execution object can be simplified. Moreover, under the pre-condition that a self-diagnostic function to store fault information as information in regard to a fault as a diagnosis object based on a fault detection result of the diagnosis object is provided, the service execution object is formed to obtain the fault information as vehicle information explained above. Under the pre-condition that the self-diagnostic program realizes the self-diagnostic function is formed in units of objects enabling the re-use, a structure for obtaining fault information as vehicle information can be explained below.

Namely, when the self-diagnostic program is provided, based on the fault detection result, at least with the fault information management object for management of the diagnosis fault information corresponding to the fault items, the service execution object obtains the diagnosis fault information as fault information by requesting, as required, the diagnosis fault information to the fault information management object. Moreover, when the self-diagnostic program is further provided with an FFD management object for management of freeze information including a vehicle condition when a fault occurs as additional information of the diagnosis fault information, the service execution object is considered to obtain the freeze information as fault information by requesting, as required, the freeze information to the FFD management object.

Moreover, when the self-diagnostic program is further provided with a fault detection object for detecting a fault of the diagnosis object, the service execution object obtains fault detection information as fault information by requesting detection information in relation to fault detection to the fault detection object. The phrase "as required" is used in describing the invention because the information is obtained only when acquisition of information is designated from the external apparatus.

As explained above, it is preferable, in the point that a change in units of the service execution object can be simplified, to obtain the fault information through operation of the object depending on the request from the service execution object. That is, the service execution object only requests the fault information without any regard for the place where the fault information is stored. The service program and self-diagnostic program installed in the vehicle controller may also be provided as a program driven in a computer. These programs are recorded to a computer-readable recording medium such as an FD, an MO, a DVD, a CD-ROM, a hard disc, or the like and can also be used by loading them to a computer system. Moreover, it is also possible that a program is recorded to a ROM or a backup RAM as a computer-readable recording medium with the ROM or RAM built into the computer system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be explained with reference to the accompanying drawings.

Figure 1:
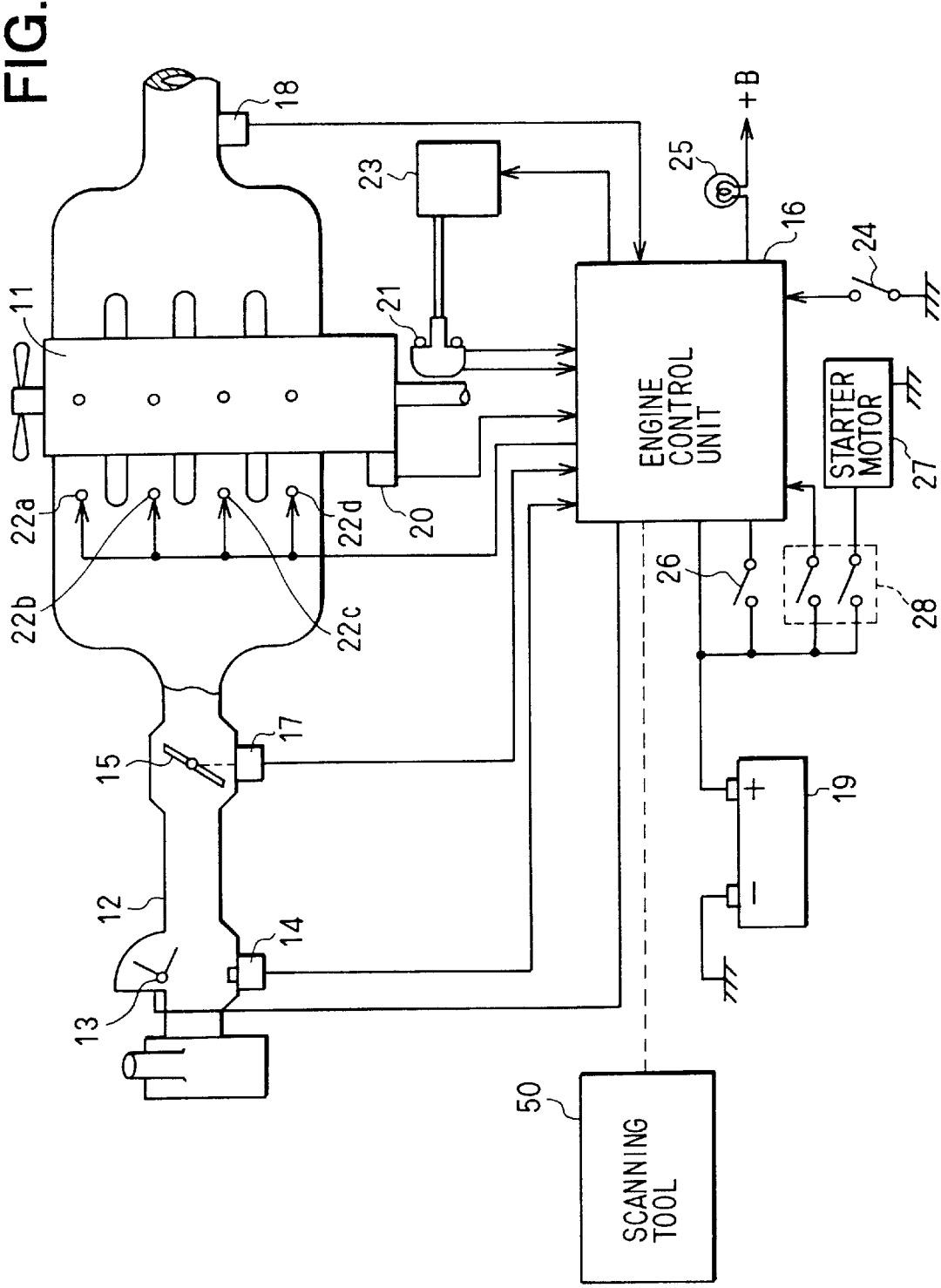
FIG. 1 is a structural diagram showing an engine control system of an embodiment of the present invention.

FIG. 1 is a structural diagram showing the entire structure of an engine control system. The engine control system is mainly formed of an engine 11 and an engine control unit 16 for controlling the engine 11. This engine control unit 16 corresponds to a "controller for a vehicle" or "vehicle controller."

Intake air from an air cleaner is supplied to the engine 11 via an intake pipe 12. To this intake pipe 12, an air flow sensor 13 for measuring an amount of the intake air, an intake air temperature sensor 14 for detecting an intake air temperature, and a throttle valve 15 that is driven by an accelerator pedal, are disposed.

Various signals indicating conditions of the engine 11 are input to the engine control unit 16. Various signals include an intake air amount detection signal from the air flow sensor 13, a throttle valve 15 opening detection signal from a throttle sensor 17, a signal from an air-fuel ratio sensor 18 for detecting oxygen concentration included in exhaust gas, a battery voltage signal from a battery 19, a detection signal from a water temperature sensor 20, a rotation signal from a distributor 21 driven by the engine 11 and a cylinder discrimination signal or the like.

The engine control unit 16 calculates a fuel injection amount, or the like, corresponding to the operating condition of the engine 11 based on these various detection signals, outputs a fuel injection command to injectors 22a, 22b, 22c, 22d preset respectively to a plurality of cylinders of the engine 11 and also executes an operation control of the engine 11 by outputting an ignition command signal to an igniter 23.

Moreover, the engine control unit 16 executes diagnosis of respective portions of the vehicle depending on each signal detected from each sensor group. Therefore, a test switch 24 for setting a diagnosis mode to output a fault detection result is disposed to the engine control unit 16 and an alarm lamp 25 for displaying a diagnosis result as a test result is also connected to the engine control unit 16. A scanning tool 50 can also be connected to the engine control unit 16, as indicated with a broken line, to read from an external device, information based on the diagnosis of each portion of the vehicle by the engine control unit 16. A switch 26 is an ignition switch for connecting the battery 19 to the engine control unit 16 and a starter switch 28 for controlling a starter motor 27 are also provided in conjunction with this ignition switch 26.

Figure 2:
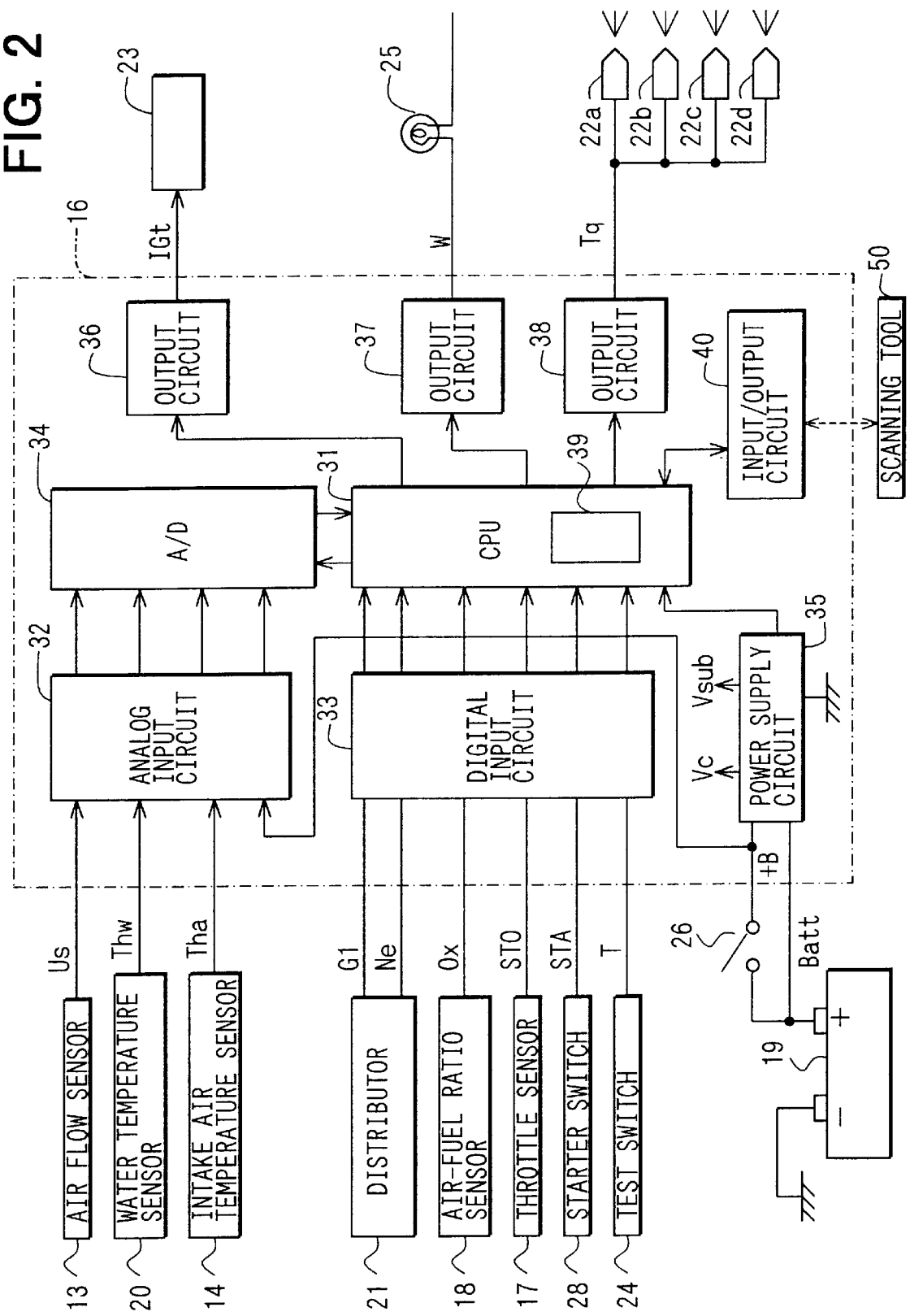
FIG. 2 is a block diagram showing a structure of the engine control unit of the embodiment.

Next, the engine control unit 16 will be explained. FIG. 2 is a block diagram showing a structure of the engine control unit 16 shown in FIG. 1. The engine control unit 16 is also provided with a CPU 31 forming a computer system. This CPU 31 receives, as an input, data from an analog input circuit 32 and a digital input circuit 33. The analog input data from the analog input circuit 32 is input to the CPU 31 through conversion into digital data in an A/D converter 34.

To the analog input circuit 32, a detection signal Us from the air flow sensor 13, a detection signal Thw from the water temperature sensor 20, a detection signal Tha from the intake air temperature sensor 14 and voltage of the battery 19 +B are respectively input. Meanwhile, to the digital input circuit 33, a cylinder discrimination signal G1 from the distributor 21 and a rotation angle signal Ne, a lean•rich signal Ox corresponding to the oxygen concentration from the air-fuel ratio sensor 18, a signal STO showing opening of the throttle valve 15 from the throttle sensor 17, a start signal STA from the starter switch 28 and a signal T for setting the diagnosis mode from the test switch 24 are input. The A/D converter 34 has a multiplexer function to sequentially select and read the various detection signals to be input to the analog input circuit 32 depending on an instruction from the CPU 31 and convert the signals into digital data. Moreover, a power supply circuit 35 supplies the voltage of battery 19 +B to the CPU 31 via the ignition switch 26 and also always supplies backup power supply voltage, Batt, thereto.

Output data from the CPU 31 is supplied to output circuits 36, 37 and 38 and it is then extracted as an output signal from the engine control unit 16. Namely, the output circuit 36 outputs an ignition instruction signal IGt to the igniter 23. The output circuit 37 outputs a signal W showing the diagnosis result to control the lighting of the alarm lamp 25. An output signal τq from the output circuit 38 indicates the fuel injection amount corresponding to the operating condition of the engine 11 and this signal is output to the injectors 22a to 22d to change the fuel injection amount of injectors 22a to 22d.

Moreover, an input/output circuit 40 is also connected to the CPU 31 for communicating with the external device. Thereby, when the scanning tool 50 is connected, data communication with the scanning tool 50 can be realized to output information requested from the scanning tool 50. Moreover, although not shown in the figure, various vehicle information pieces can be obtained from outside the engine control unit by using a network within the vehicle via the input/output circuit 40.

Within the CPU 31, a memory 39 for storing a self-diagnostic program and a service program, to be explained later, is provided. This memory 39 is formed of a standby RAM or a non-volatile EEPROM to store data to which electric power is supplied even when ROM and the ignition switch 26 are turned OFF. The self-diagnostic program and service program are stored within the ROM. As will be explained later, diagnosis fault information as "diagnosis fault information" and freeze frame data (hereinafter referred to as "FFD") as "freeze information" including the vehicle condition when a fault occurs, are stored by the self-diagnostic program in the standby RAM or EEPROM. This embodiment is characterized in a format of the program stored in the ROM of memory 39. Next, the program format will be explained.

Figure 3:
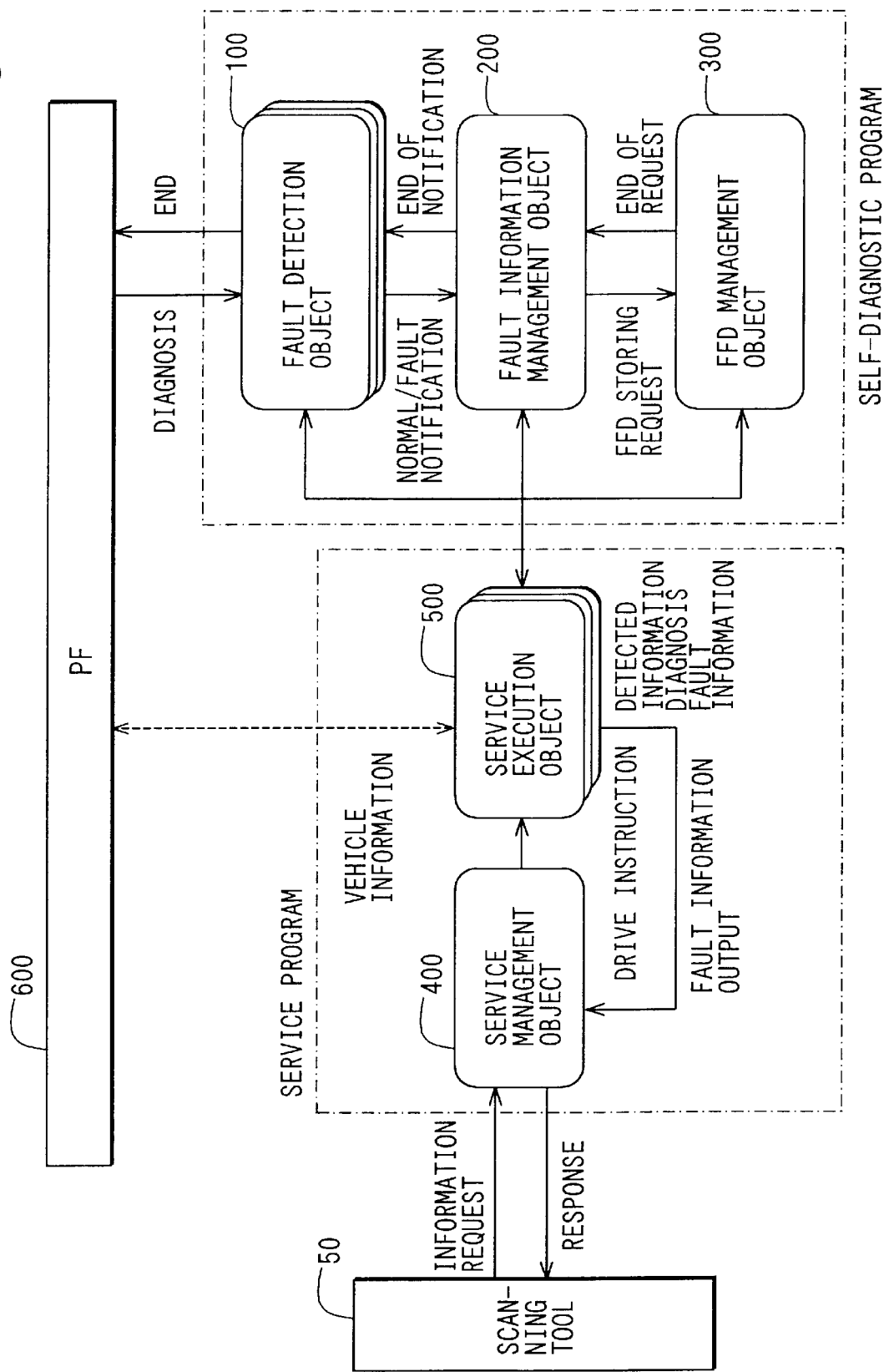
FIG. 3 is an explanatory diagram showing a concept of a program format of the embodiment.

FIG. 3 shows a concept of the format (architecture) of the program stored in the ROM of the memory 39. The program indicated in this figure is object-oriented designed and is described in such a manner that an object is a minimum structural unit. In the program as a whole, processes are sequentially executed by combining the objects with a message passed from one object to another. An object is provided with data (attribute) and a method (procedure) for the data. The method of an object is executed by a message from another object. In this embodiment, the expression using "object" as the subject of a sentence, or "object executes . . . ", is often used as explained above, but the execution is actually carried out when the CPU 31 executes the process program. Moreover, each object is noted as such in the figure.

As shown in FIG. 3, the program in this embodiment is provided with at least a fault detection object 100, a fault information management object 200, an FFD management object 300, a service management object 400 and a service execution object 500. These objects 100 to 500 are programs on a platform (hereinafter referred to as "PF") 600. The program operates while executing information exchange as required with the PF 600.

As indicated with a chain line in FIG. 3, the objects 100 to 300 are structural elements of the self-diagnostic program and the objects 400 and 500 are structural elements of the service program. The fault detection object 100 is prepared for every fault detection process of a diagnosis object. When the diagnosis is started by an instruction from the PF 600, a fault diagnosis object as an object of self-diagnosis is detected based on information from each sensor group input to the engine control unit 16. The fault information management object 200 determines a fault level when a normal/fault message is sent from the fault detection object 100 and stores the diagnosis fault information. The FFD management object 300 obtains the vehicle condition from the PF 600 when an FFD storage request is sent from the fault information management object 200 and stores the FFD.

The service management object 400 executes a communication process with the scanning tool 50, when the scanning tool 50 is connected, to set up a data communication ready condition. Connection of this scanning tool 50 via the input/output circuit 40 has already been explained (refer to FIG. 2). When an information request is generated from the scanning tool 50, the service execution object 500 is alerted to issue a drive instruction. For this drive instruction, fault information output from the service execution object 500 is output to the scanning tool 50 as a response.

The service execution object 500 is prepared for every aggregation of predetermined fault items. This aggregation corresponds to a "vehicle information group". When the drive instruction is issued from the service execution object 500, the fault information is sent to objects 100 to 300 which consist of the fault detection object 100, fault information management object 200, and FFD management object 300. Therefore, objects 100 to 300 collect and output the requested fault information.

Objects 100 to 300 forming the self-diagnostic program store the diagnosis fault information and FFD based on the diagnosis instruction from the PF 600 and also output the requested fault information in response to the request of the fault information from the service execution object 500. Therefore, combining objects 100 to 300 will be explained in more detail by referring to a message sequence chart (hereinafter referred to as "MSC") in relation to storage of fault information.

Figure 4:
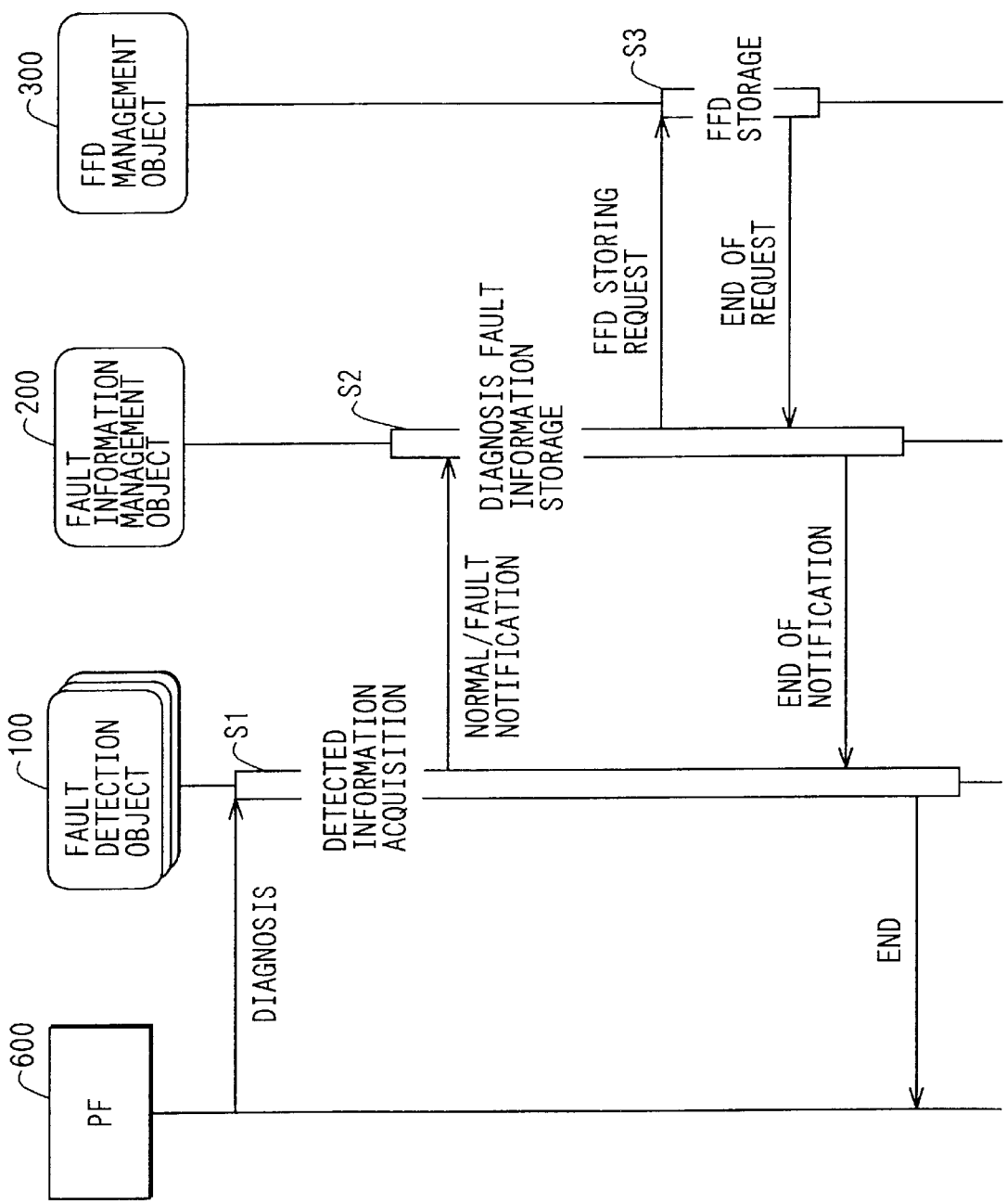
FIG. 4 is an explanatory diagram of a message sequence chart showing a sequence of storing fault information.

FIG. 4 is the MSC indicating the sequence for storing the fault information. First, the PF 600 notifies the start of diagnosis to the fault detection object 100. This message to notify the start of the diagnosis is sent in respective timings for each fault detection object 100. The fault detection object 100 having received the instruction for starting diagnosis from the PF 600 executes a fault detection process S1. With this fault detection process S1, the detection information such as each sensor value as "detection information" in relation to the fault detection is obtained and a normal condition or a fault condition is sent to the fault information management object 200.

When the normal/fault message is sent, the fault information management object 200 executes a fault level determination process S2 and stores the diagnosis fault information. The diagnosis fault information may naturally be stored within the fault information management object 200 itself, but it is preferably stored within a fault information storing object (not shown) prepared additionally when re-use of the self-diagnostic program is considered. Here, as diagnosis fault information, "temporary fault" indicating a temporary fault, or "determined fault" indicating a continuous fault or "normal" indicating the normal condition is stored.

Moreover, when FFD storage timing is determined in the fault level determination process S2 of the fault information management object 200, an FFD storage request is sent to the FFD management object 300. Whether it is the FFD storage timing or not is different for every fault detection object 100, in more detail, for every fault detection content. Namely, the FFD is sometimes stored when a fault is defined as a determined fault or when a fault is detected.

When the FFD storage request message is issued, the FFD management object 300 executes an FFD storing process S3. In this FFD storing process S3, the vehicle condition is obtained from the PF 600 to store the FFD. Like the diagnosis fault information, this FFD may be stored in the FFD management object 300 itself, but it is preferably stored in an FFD storing object (not shown) prepared separately. When the FFD is stored, the FFD management object 300 sends a message to end the request of the FFD storage request, to the fault information management object 200.

An end of notification message for the fault detection object 100 is output by the fault information management object 200 and the fault detection object 100 notifies the PF 600 of the end of diagnosis. Thereby, the diagnosis process is completed. Subsequently, combining objects 100 to 500 will be explained with reference to the MSC in relation to a read operation of the fault information with the scanning tool 50.

Figure 5:
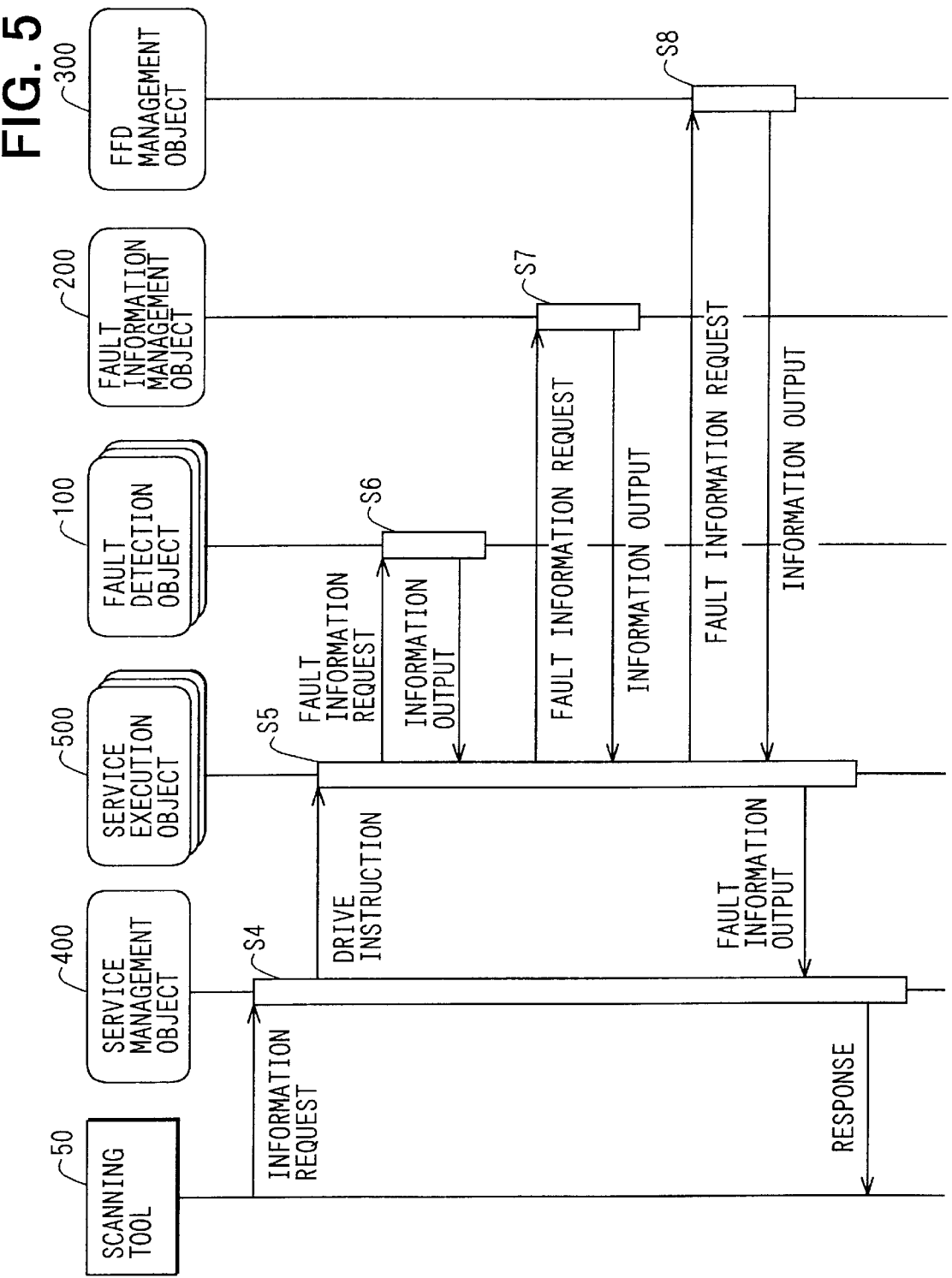
FIG. 5 is an explanatory diagram of a message sequence chart showing a sequence for reading the fault information.

FIG. 5 is the MSC indicating a fault information read sequence. An operator of the scanning tool 50 designates a category of the fault information and the fault information in the category as a read object. This category is classified into a sort called the Mode determined by legislation or determined by a request of a vehicle manufacturer. It has already been explained that the service execution object 500 is prepared for every predetermined aggregation of the fault information. In more detail, the service execution object 500 is prepared in units according to a category designated via the scanning tool 50.

As explained above, the information request is sent to the service management object 400 from the scanning tool 50, but this information request includes identification data for identifying the category explained above and designation data (parameter) for designating the fault information within the category. The service management object 400 executes a drive process S4 in response to the information request from the scanning tool 50. In this drive process S4, the corresponding service execution object 500 is determined by the identification data explained above and the drive instruction is issued to the service execution object 500. In this case, the designation data explained above is output together with the drive instruction. When the drive instruction is issued, the service execution object 500 executes a fault information acquisition process S5. In the fault information acquisition process S5, the fault information is sent to at least any one of the objects 100 to 300 based on the designation data output together with the drive instruction.

When the service execution object 500 requests the fault information, the fault detection object 100 executes a detected information output process S6 and outputs detected information. Moreover, in the same manner, the fault information management object 200 executes a diagnosis fault information output process S7 to output the diagnosis fault information and the FFD management object 300 executes an FFD output process S8 to output the FFD.

The service execution object 500 outputs the obtained fault information to the service management object 400 when the information is output from all of the objects 100 to 300 having requested the fault information. Thereby, the service management object 400 issues the response to the scanning tool 50.

This embodiment has a characteristic in the format of the program stored in the ROM of the memory 39, and in more detail, has the characteristic in a format of the service program. Therefore, the drive process S4, diagnosis fault information acquisition process S5, detected information output process S6, diagnosis fault information output process S7 and FFD output process S8 shown in FIG. 5 will be explained more practically for full understanding of operations of the objects 100 to 500.

Figure 6:
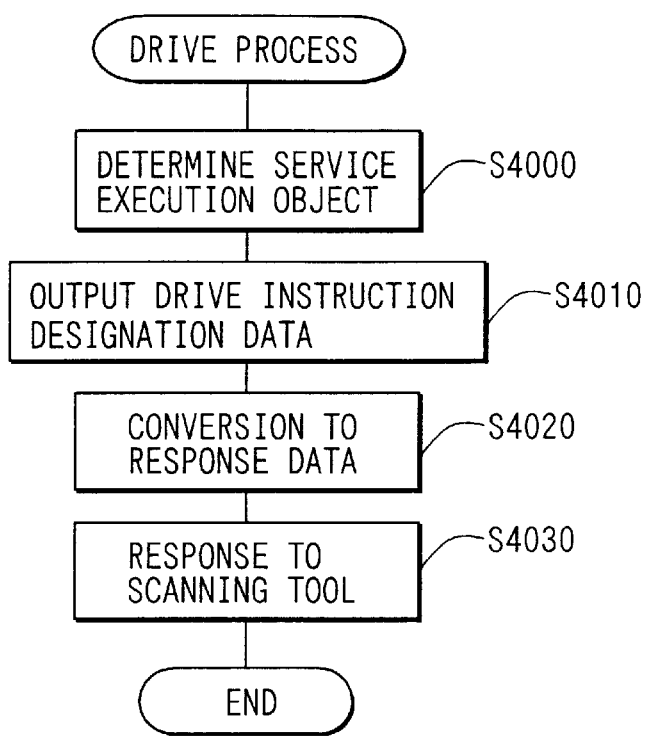
FIG. 6 is a flowchart showing a drive process to be executed by a service management object.

First, the drive process S4 will be explained. FIG. 6 is a flowchart showing the drive process S4 to be executed by the service management object 400. In a first step (hereinafter a term "step" is indicated only by the letter "S") 4000, the service execution object 500 is determined based on the identification data explained above. For example, when the identification data designates "Mode$02", the service execution object 500 for obtaining the FFD is determined as an object 500.

In S4010, the drive instruction is issued to the service execution object 500 determined in S4000. In this case, the designation data explained above is output. With the drive instruction in S4010, the service execution object 500 outputs the fault information. Accordingly, after the fault information is output from the service execution object 500, having issued the drive instruction, the fault information is converted to response data in S4020. This process converts the fault information conforming to a communication protocol for the scanning tool 50. In S4030, the converted response data is output as a response to the scanning tool 50. Thereafter, the drive process S4 ends.

Figure 7:
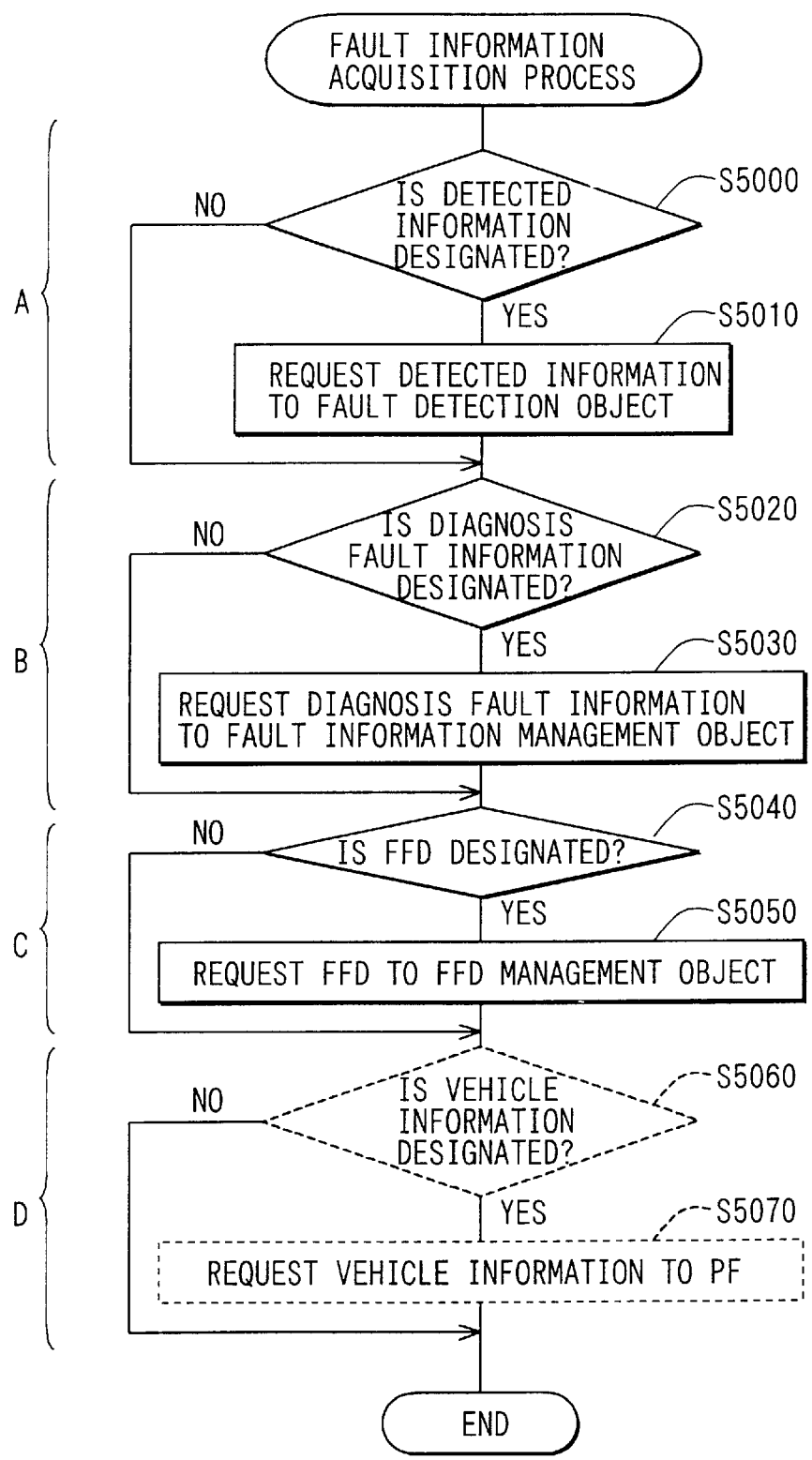
FIG. 7 is a flowchart showing a fault information acquisition process to be executed by a service execution object.

Subsequently, the diagnosis fault information acquisition process S5 will be explained. FIG. 7 is a flowchart indicating the diagnosis fault information acquisition process S5 executed by the service execution object 500. In a first step S5000, it is determined whether the information to be detected is designated or not. This determination is conducted based on the designation data explained above. When it is determined (S5000: YES) that the information to be detected is designated, the designated information to be detected is sent to the fault detection object 100 in S5010. When the information to be detected is obtained, the process goes to S5020. Meanwhile, when it is determined that the information to be detected is not designated (S5000: NO), step S5010 is not executed and the process goes to S5020.

In S5020, it is determined whether the diagnosis fault information is designated or not. This determination is also based on the designation data explained above. When it is determined that the diagnosis fault information is designated (S5020: YES), the designated diagnosis fault information is sent to the fault information management object 200 in S5030. Thereby, when the diagnosis fault information is obtained, the process goes to S5040. However, when it is determined that the diagnosis fault information is not designated (S5020: NO), step S5030 is not executed and the process goes to S5040.

In S5040, whether the FFD is designated or not is determined. This determination is also based on the designation data explained above. When it is determined that the FFD is designated (S5040: YES), the designated FFD is sent to the FFD management object 300. Accordingly, after the FFD is obtained, the fault information acquisition process S5 is completed. On the other hand, when it is determined that the FFD is not designated (S5040: NO), step S5050 is not executed and the fault information acquisition process S5 is completed.

Here, it should be noted that the three processes A, B, and C, namely the process in relation to the acquisition of the detected information from the fault detection object 100 in FIG. 7 (process in S5000 and S5010 indicated with the letter A, hereinafter referred to as "process A"), the process in relation to the acquisition of the diagnosis fault information from the fault information management object 200 (process in S5020 and S5030 indicated with the letter B, hereinafter referred to as "process B") and the process in relation to the acquisition of the FFD from the FFD management object 300 (process in S5040 and S5050 indicated with the letter C, hereinafter referred to as "process C") are not always described simultaneously in the fault information acquisition process S5, because it is also thought that the service execution object 500 is prepared in units of category designated with the scanning tool 50 and only the FFD is included, for example, in a certain category. In the fault information acquisition process S5 executed by the service execution object 500 corresponding to the category including only the FFD, only the process C is described. More practically, the service execution object 500, for example, corresponding to "Mode$02" to read the FFD, corresponds to such case. In this case, for example, when an "engine speed when a fault occurs" is designated by the designation data, the service execution object 500 sends, in the process C, the "engine speed when a fault occurs" to the FFD management object 300. In the same manner, only one process (process A or B) is described in a certain service execution object 500 and two processes (processes A and B, or B and C or C and A) are described.

Figure 8:
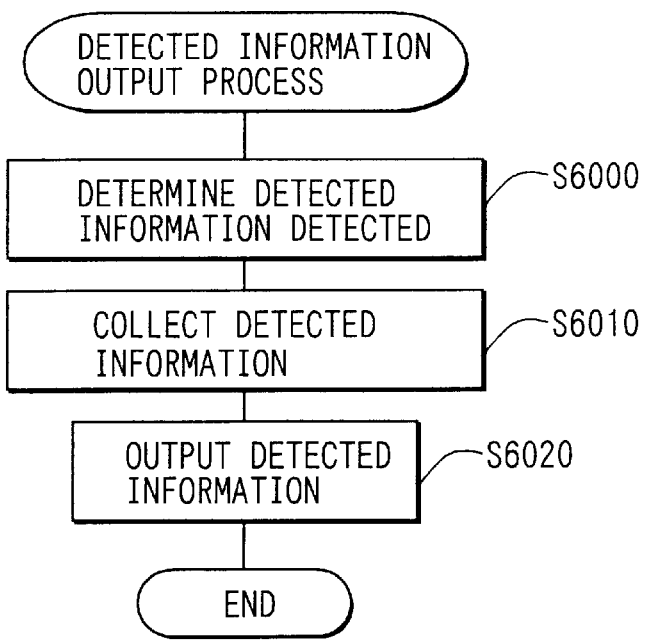
FIG. 8 is a flowchart showing a detected information output process to be executed by a fault detection object.

Subsequently, the detected information output process S6 will be explained. FIG. 8 is a flowchart indicating the detected information output process S6 executed by the fault detection object 100. In a first step S6000, the information to be detected from the service execution object 500 is determined. In subsequent step S6010, the information pieces to be detected are collected in such a manner, for example, that the sensor values output in real-time from the sensor group are collected. In the next step S6020, after the collected information pieces to be detected are output, the detected information output process S6 ends.

Continuing, the diagnosis fault information output process S7, to be executed by the fault information management object 200, and the FFD output process S8, to be executed by the FFD management object 300, will be explained based on the flowcharts of FIG. 9 and FIG. 10. These processes are similar to the detected information process S6 explained above and therefore the processes are explained briefly.

Figure 9:
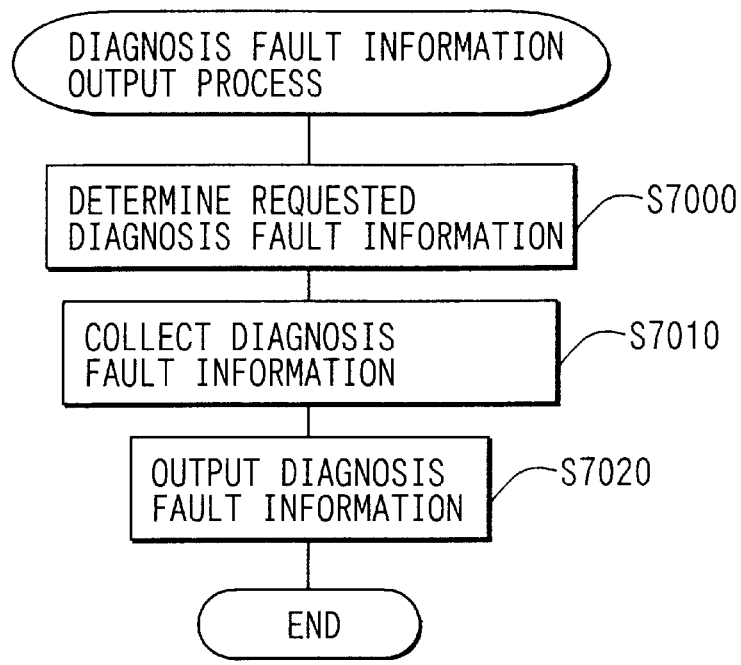
FIG. 9 is a flowchart showing a diagnosis fault information output process to be executed by a fault information management object.

In the diagnosis fault information output process S7, when the process is started, the requested diagnosis fault information is determined (S7000 in FIG. 9). The diagnosis fault information is collected by reading it, for example, from the fault information storing object in which the diagnosis fault information is stored (S7010). Subsequently, the collected diagnosis fault information is output (S7020). Thereafter, this diagnosis fault information output process S7 ends.

Figure 10:
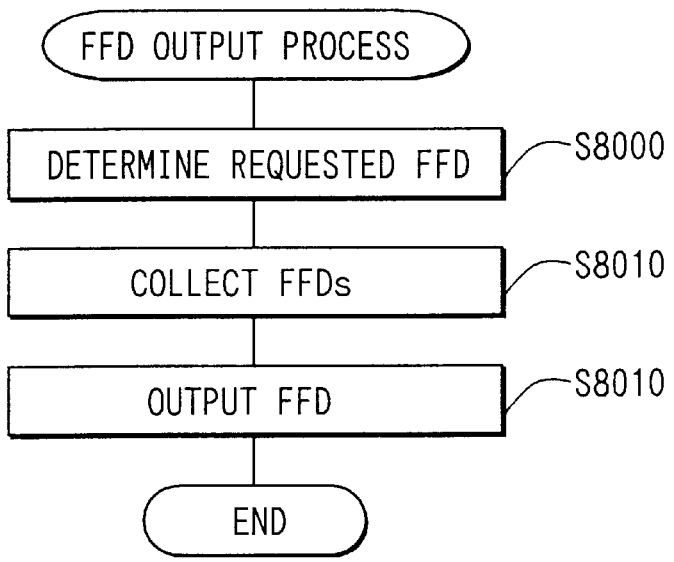
FIG. 10 is a flowchart showing an FFD output process to be executed by an FFD management object.

When the process is started in the FFD output process S7, the requested FFD is determined (S8000 in FIG. 10). The FFD is collected (S8010) by reading it, for example, from the FFD storing object in which the FFD is stored. The FFD is then output (S8020). Thereafter, this FFD output process S8 ends.

The effect of formatting the objects 100 to 500 will be explained below. In this embodiment, the service program is formatted in classification of the service management object 400 for communicating with the scanning tool 50 and the service execution object 500 for requesting and obtaining the fault information of objects 100 to 300 (refer to FIG. 3). Namely, the communication function with the scanning tool 50 and the fault information acquisition function are realized with different objects. Thereby, when only the method of communication with the scanning tool 50 is changed, it can be covered easily by altering only the service management object 400. In this case, the service execution object 500 can be reused as it is and re-use property of the service program can be improved.

Moreover, in this embodiment, the service execution object 500 is prepared for every category designated with the scanning tool 50. In other words, the service execution object 500 is prepared for every aggregation of the fault information (vehicle information group) belonging to the designated category. Therefore, if the fault information of the read object is changed, an update job in units of aggregation becomes possible to easily cover the change of fault information. The category designated with the scanning tool 50 is determined based on legislation and/or on a requirement from a vehicle manufacturer. Therefore, there is a higher possibility for change of fault information in units of this category. In the case where the service execution object 500 is prepared in units of the aggregation of the fault information having the higher possibility for simultaneous change, the possibility for summarizing various changes in units of the object becomes higher. Accordingly, the number of service execution objects 500 which may be re-used increases, making a contribution to the improvement of the re-use property of the service program.

Moreover, in this embodiment, the service management object 400 determines the service execution object 500 (S4000 in FIG. 6) based on the identification data from the scanning tool 50. Thereby, the determination process for the service execution object 500 with the service management object 400 can be simplified. It is because the identification data corresponds to the category to be input. For example, it is enough when the correspondence between the identification data and service execution object 500 is prepared. Moreover, in this embodiment, the service execution object 500 requests the fault information of objects 100 to 300 (S5010, S5030, S5050 in FIG. 7) on the basis of the designation data for designating information in the category. Thereby, the vehicle information acquisition process by the service execution object 500 can also be simplified.

As explained above, the service execution object 500 obtains the fault information output from objects 100 to 300 by sending the fault information to objects 100 to 300. Namely, the fault information can be obtained through operations of objects 100 to 300 depending on the request from the service execution object 500 (refer to FIGS. 8, 9, and 10). That is, the service execution object 500 only requests the fault information and is not required to regard an area in which the fault information is stored. As a result, change in units of service execution object 500 can be extremely simplified.

The present invention is not limited to the embodiment explained above and allows various changes or modifications within the scope without departing from the subject matter of the claims.

(a) In this embodiment, the service execution object 500 is prepared in units of category designated with the scanning tool 50. In this case, it is possible to accomplish the determination process by the service management object 400 which can be simplified in such a point that the identification data output from the scanning tool 50 corresponds to the drive service execution object 500 on a one to one basis. However, a setting unit of the service execution object 500 is not limited to that explained here. The setting unit can be thought of in consideration of various modification patterns of the system, that is, to be set in units of aggregation of the fault information having the higher possibility for simultaneous change.

(b) Moreover, in the above embodiment, an example of reading fault information with the scanning tool 50 is explained but the information as a read object of the scanning tool 50 is not limited to the fault information. Namely, the case can be considered where the vehicle information, including the fault information, is a read object.

More practically, steps S5060 and S5070 in FIG. 7 (process shown with a broken line indicated by the letter D, hereinafter referred to as "process D") is described in the fault information acquisition process S5 of the service execution object 500. Namely, when the vehicle information is designated (S5060: YES) in the determination whether the vehicle information is designated or not (S5060), the vehicle information is sent to the PF 600 (S5070). Thereby, a structure for reading the various vehicle information pieces such as information in relation to emissions and information related to an actuator can also be realized by the process D and the process in relation to the vehicle information output in the side of PF 600 corresponding to process D. The vehicle information is also thought of as information obtained from the PF 600 via the network in the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle controller with an information providing function to read and output, upon request from an external apparatus, information about a controlled vehicle using an object-oriented service program, said controller object-oriented service program comprising:

a service execution object to obtain vehicle information; and a service management object for data communication with the external apparatus and issuing, upon an information request from the external apparatus, vehicle information obtained by the service execution object to the external apparatus.

2. A vehicle controller as in claim 1, including a self-diagnostic program for storing fault information based on a fault detection result of a diagnosis object, and wherein the service execution object obtains the fault information as vehicle information.

3. A vehicle controller as in claim 2, wherein the self-diagnostic program is structured in units of objects enabling re-use, further comprising:

a fault information management object for management of diagnosis fault information corresponding to fault items based on fault detection result; and wherein the service execution object obtains the diagnosis fault information as fault information by requesting, as required, diagnosis fault information from the fault information management object.

4. A vehicle controller as in claim 3, wherein the self-diagnostic program further comprises an FFD management object for management of freeze information, which is additional diagnosis fault information, including a vehicle condition when a fault occurs, and wherein the service execution object obtains the freeze information as fault information by requesting, as required, the freeze information from the FFD management object.

5. A vehicle controller as in claim 4, wherein the self-diagnostic program further comprises a fault detection object for detecting a fault of the diagnosis object, and wherein the service execution object obtains detection information as fault information by requesting, as required, detection information in relation from the fault detection from the fault detection object.

6. A vehicle controller as in claim 5, further comprising:

a computer-readable recording medium to record data communications with the external apparatus.

7. A vehicle controller as in claim 3, wherein the self-diagnostic program further comprises a fault detection object for detecting a fault of the diagnosis object, and wherein the service execution object obtains detection information as fault information by requesting, as required, detection information in relation to the fault detection from the fault detection object.

8. A vehicle controller as in claim 1, further comprising:

a computer-readable recording medium to record data communications with the external apparatus.

9. A vehicle controller with an information providing function to reach and output, upon request from an external apparatus, information about controlled vehicle using an object-oriented service program, said controller object-oriented service program comprising:

a service execution object prepared for each of plural vehicle information groups to each obtain a respectively predetermined aggregation of vehicle information data; and a service management object for data communication with the external apparatus, by determining, upon an information request from the external apparatus, an appropriate service execution object, issuing a drive instruction to the thus determined service execution object and outputting vehicle information obtained by that service execution object to the external apparatus.

10. A vehicle controller as in claim 9, wherein a vehicle information group is an aggregation of vehicle information pieces having a high possibility of simultaneous change based on a pattern of changing vehicle information pieces.

11. A vehicle controller as in claim 10, wherein a vehicle information group is defined as an aggregation of vehicle information pieces determined depending on at least one of legislation or vehicle manufacturer requirements.

12. A vehicle controller as in claim 11, wherein an information request from the external apparatus includes at least identification data for identifying a vehicle information group, and the service execution object determines the appropriate service execution object based on the identification data.

13. A vehicle controller as in claim 11, including a self-diagnostic program for storing fault information based on a fault detection result of a diagnosis object, and wherein the service execution object obtains the fault information as vehicle information.

14. A vehicle controller as in claim 10, wherein an information request from the external apparatus includes at least identification data for identifying a vehicle information group, and the service execution object determines the appropriate service execution object based on the identification data.

15. A vehicle controller as in claim 10, including a self-diagnostic program for storing fault information based on a fault detection result of a diagnosis object, and wherein the service execution object obtains the fault information as vehicle information.

16. A vehicle controller as in claim 9, wherein an information request from the external apparatus includes at least identification data for identifying a vehicle information group, and the service execution object determines the appropriate service execution object based on the identification data.

17. A vehicle controller as in claim 16, wherein an information request from the external apparatus further includes designation date for designating vehicle information within a vehicle information group, the service management object outputs the designation data together with a drive instruction and the service execution object obtains said vehicle information from a vehicle information group based on the designation data output from the service management object.

18. A vehicle controller as in claim 17, including a self-diagnostic program for storing fault information based on a fault detection result of a diagnosis object, and wherein the service execution object obtains the fault information as vehicle information.

19. A vehicle controller as in claim 16, including a self-diagnostic program for storing fault information based on a fault detection result of a diagnosis object, and wherein the service execution object obtains the fault information as vehicle information.

20. A vehicle controller as in claim 9, including a self-diagnostic program for storing fault information based on a fault detection result of a diagnosis object, and wherein the service execution object obtains the fault information as vehicle information.

21. An object-oriented service program to provide vehicle information upon request from an external apparatus, said program comprising:

a service execution object to obtain vehicle information; and a service management object for data communication with the external apparatus and issuing, upon an information request from the external apparatus, vehicle information obtained by the service execution object to the external apparatus.

22. An object-oriented service program as in claim 21, further comprising a self-diagnostic program for storing fault information based on a fault detection result of a diagnosis object, and wherein the service execution object obtains the fault information as vehicle information.

23. A vehicle controller including an object-oriented service program as in claim 22, wherein the self-diagnostic program includes:

a fault information management object for management of diagnosis fault information corresponding to fault items based on fault detection result; and wherein the service execution object obtains the diagnosis fault information as fault information by requesting, as required, diagnosis fault information from the fault information management object.

24. A vehicle controller as in claim 23, wherein the self-diagnostic program further includes an FFD management object for management of freeze information, which is additional diagnosis fault information, including a vehicle condition when a fault occurs, and wherein the service execution object obtains the freeze information as fault information by requesting, as required, the freeze information from the FFD management object.

25. A vehicle controller as in claim 24, wherein the self-diagnostic program further includes a fault detection object for detecting a fault of the diagnosis object, and wherein the service execution object obtains detection information as fault information by requesting, as required, detection information in relation from the fault detection to the fault detection object.

26. A vehicle controller as in claim 23, wherein the self-diagnostic program further includes a fault detection object for detecting a fault of the diagnosis object, and wherein the service execution object obtains detection information as fault information by requesting, as required, detection information in relation to the fault detection from the fault detection object.

27. An object-oriented service program to provide vehicle information upon request from an external apparatus, said program comprising:
   a service execution object prepared for each of plural vehicle information groups to obtain a respectively predetermined aggregation of vehicle information data; and
   a service management object for data communication with the external apparatus, by determining, upon an information request from the external apparatus, an appropriate service execution object, issuing a drive instruction to the thus determined service execution object and outputting vehicle information obtained by that service execution object to the external apparatus.

28. An object-oriented service program as in claim 27, wherein a vehicle information group is an aggregation of vehicle information pieces having a high possibility of simultaneous change based on a pattern of changing vehicle information pieces.

29. An object-oriented service program as in claim 28, wherein a vehicle information group is defined as an aggregation of vehicle information pieces determined depending on at least one of legislation or vehicle manufacturer requirements.

30. An object-oriented service program as in claim 29, wherein an information request from the external apparatus includes at least identification data for identifying a vehicle information group, and the service execution object determines the appropriate service execution object based on the identification data.

31. An object-oriented service program as in claim 29, further comprising a self-diagnostic program for storing fault information based on a fault detection result of a diagnosis object, and wherein the service execution object obtains the fault information as vehicle information.

32. An object-oriented service program as in claim 28, wherein an information request from the external apparatus includes at least identification data for identifying a vehicle information group, and the service execution object determines the appropriate service execution object based on the identification data.

33. An object-oriented service program as in claim 28, further comprising a self-diagnostic program for storing fault information based on a fault detection result of a diagnosis object, and wherein the service execution object obtains the fault information as vehicle information.

34. An object-oriented service program as in claim 27, wherein an information request from the external apparatus includes at least identification data for identifying a vehicle information group, and the service execution object determines the appropriate service execution object based on the identification data.

35. A vehicle controller including an object-oriented service program as in claim 34, wherein an information request from the external apparatus further includes designation data for designating vehicle information within a vehicle information group, the service management object outputs the designation data together with a drive instruction and the service execution object obtains said vehicle information from a vehicle information group based on the designation data output from the service management object.

36. An object-oriented service program as in claim 35, further comprising a self-diagnostic program for storing fault information based on a fault detection result of a diagnosis object, and wherein the service execution object obtains the fault information as vehicle information.

37. An object-oriented service program as in claim 34, further comprising a self-diagnostic program for storing fault information based on a fault detection result of a diagnosis object, and wherein the service execution object obtains the fault information as vehicle information.

38. An object-oriented service program as in claim 27, further comprising a self-diagnostic program for storing fault information based on a fault detection result of a diagnosis object, and wherein the service execution object obtains the fault information as vehicle information.

39. A method for organizing an object-oriented computer program constituting a vehicle controller service program used for interfacing with an external scan tool, said method comprising:
   defining a service management object that communicates to/from an external scanning tool; and
   defining plural service execution objects that communicate with said service management object and with at least one self-diagnostic program object of the vehicle controller;
   wherein an information request from the external scanning tool to the service management object causes it to obtain respectively associated vehicle information from at least one service execution object and to furnish such obtained information to the external scan tool.

40. A vehicle controller including an object-oriented computer program constituting a vehicle controller service program used for interfacing with an external scan tool, said service program comprising:
   a service management object that communicates to/from an external scanning tool; and
   plural service execution objects that communicate with said service management object and with at least one self-diagnostic program object of the vehicle controller;
   wherein an information request from the external scanning tool to the service management object causes it to obtain respectively associated vehicle information from at least one service execution object and to furnish such obtained information to the external scan tool.

* * * * *